C. H. KOYL.
APPARATUS FOR THE CONTINUOUS PURIFICATION OF WATER.
APPLICATION FILED JAN. 3, 1910.
960,959.
Patented June 7, 1910.
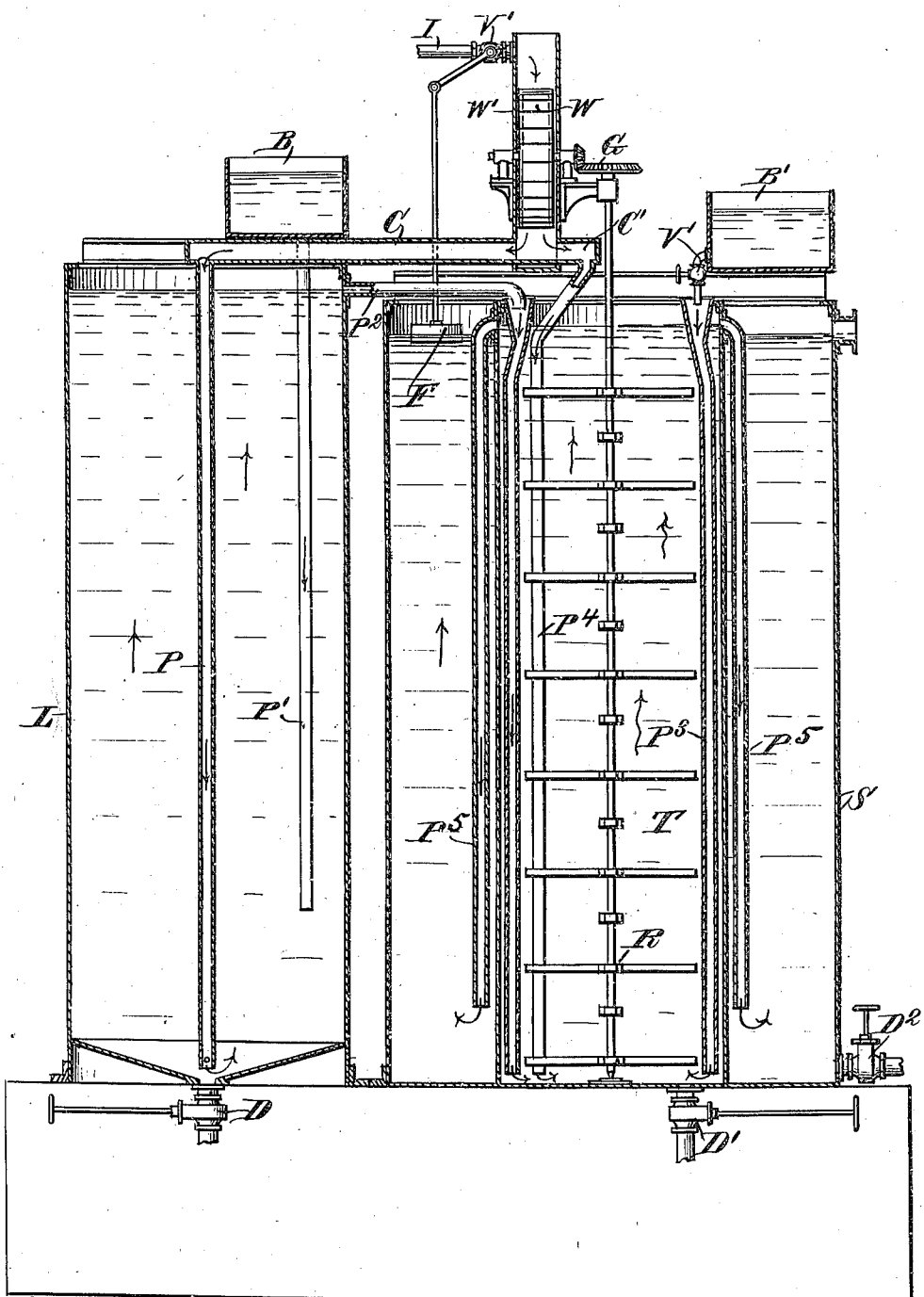

UNITED STATES PATENT OFFICE.

CHARLES HERSCHEL KOYL, OF NEW YORK, N. Y.

APPARATUS FOR THE CONTINUOUS PURIFICATION OF WATER.

960,959.      Specification of Letters Patent.      Patented June 7, 1910.

Application filed January 3, 1910. Serial No. 535,915.

*To all whom it may concern:*

Be it known that I, CHARLES HERSCHEL KOYL, a citizen of the United States, residing in New York, in the county and State of New York, have invented a certain new and useful Improvement in Apparatus for the Continuous Purification of Water, of which the following is a specification.

This invention relates to an improvement in apparatus for purifying water, having its object to make more thorough the mixing of the water with the chemical reagents, and to expedite the settling of the solid matter precipitated from the water and the reagents.

In the art it has been the practice to introduce the hard or muddy water and the several reagents at the top of the precipitating chamber, and to effect a partial mixing of these various liquids by their descent together through the precipitating chamber to its bottom, at which there is an exit leading to a settling chamber, up through which the water rises slowly while the precipitate settles. But it has been found that in a settling chamber of practicable size, only the heavier pieces of precipitate settle, and that much of the fine precipitate is carried up through the settling chamber by the current of softened water, and that therefore the water must be filtered to become usable. To obviate this difficulty, many devices have been constructed for use in the settling chamber, each of which adds to the cost of the machine, and many of which require periodic and frequent cleaning, while the water must still be filtered. I have discovered that the difficulty may be overcome by introducing the hard water and each of the reagents separately at the bottom of the precipitating chamber, and compelling the mixture to flow upward through this chamber instead of downward as in ordinary practice. By means of this device the water of the precipitating chamber becomes loaded with old precipitate, the pieces of which grow constantly larger by continuous accretions, as a snowball grows by rolling, and which gather to themselves all the fine particles of precipitate as they are formed; so that, in the end, when the water of the precipitating chamber can hold no more in suspension and these pieces are carried over into the settling chamber, they settle very rapidly and leave the water at the top of the settling chamber so perfectly clear that no filter is needed, and the water may be used at once for drinking or other purposes. By carrying the raw water and the dissolved reagents separately to the lower part of the precipitating tank where they meet for the first time and begin their reactions in the presence of the old precipitate, the latter is caused to meet the new precipitate at the moment of its birth, or in nascent condition, and maximum agglomerating effect is obtained. It is this feature which characterizes my invention. I prefer to continuously stir the water of the precipitating tank, because it insures not only the thorough mixing of the reagents with the water, but also the thorough rubbing of the fine particles of precipitate against the large pieces which act as agglomerators.

It is evident that the pipes which conduct separately the raw water and reagent or reagents to the bottom of the precipitating tank may come down either outside or inside said tank so long as the liquids meet for the first time and begin their reactions at or near the bottom of the precipitating tank and proceed thence upward to the outlet near the top of said tank.

The apparatus will of course be fitted with the usual equipment of water wheel, lime tank, reagent boxes or tanks etc.

The settling tank can be superposed upon the precipitating tank, or can surround the same, or the two can be placed side by side according to circumstances or as desired.

In the accompanying drawing I have represented a form of apparatus embodying my improvement in which the settling tank surrounds the precipitating tank.

The figure is a vertical central section of the apparatus.

L is the lime tank, T is the precipitating tank, S is the settling tank, B is the lime reservoir, B' is the soda reservoir.

W is the waterwheel, W' is the water wheel box, I is the raw water intake, C is the raw water chute from box W' to lime tank, C' is the raw water chute to precipitating tank, P is pipe from chute C to bottom of lime tank, P' is pipe from lime box B into lime tank.

V and V' are valves regulating the raw water and soda supply respectively; the former valve being connected to and controlled by a float F.

D, D' D² are discharge valves for the tanks L, T, S, respectively.

R is a rotary stirrer in the precipitating tank and G is the gearing by which it is driven from the water wheel.

P² is the pipe which leads lime water from the lime tank to the bottom of the precipitating tank T.

P³ is the pipe which leads the soda solution from soda box B' to the bottom of the precipitating tank.

P⁴ is the pipe which leads the raw water to the bottom of the precipitating tank.

P⁵ are the pipes which lead the treated water from the top of the precipitating tank to the settling tank.

A filter may of course be used in connection with the settling tank if desired, but as hereinbefore indicated, it would be rather a nicety than a necessity. Such precipitate as may be carried over from the precipitating tank into the settling tank, is in comparatively large pieces, which settle very rapidly.

Obviously the structural details of the apparatus may vary considerably; what is essential, whatever reagent or reagents be employed, being that the reactions shall begin in the lower part of the precipitating tank in the presence of the old precipitate.

What I claim therefore, and desire to secure by Letters Patent, is—

In apparatus for the continuous purification of water, a precipitating tank in which the raw water is treated and the precipitates resulting from that treatment are formed, a settling tank, an outlet at the upper end of the precipitating tank communicating with the inlet of the settling tank, and inlets at the lower end of the precipitating tank communicating through separate ducts with the sources of raw water and reagent supplies respectively, substantially as and for the purpose hereinbefore set forth.

In testimony whereof I affix my signature in presence of two witnesses.

CHARLES HERSCHEL KOYL.

Witnesses:
  I. A. BERG,
  HERSCHEL A. HUNTER.